(12) United States Patent
Gao et al.

(10) Patent No.: US 11,388,520 B2
(45) Date of Patent: Jul. 12, 2022

(54) DISPLAY DEVICE

(71) Applicant: SHENZHEN TCL NEW TECHNOLOGY CO., LTD., Guangdong (CN)

(72) Inventors: Weibiao Gao, Guangdong (CN); Shenglin Zhu, Guangdong (CN); Fanghong Yan, Guangdong (CN); Lanxiang Zhang, Guangdong (CN)

(73) Assignee: Shenzhen TCL New Technology Co., Ltd., Shenzhen (CN)

(*) Notice: Subject to any disclaimer, the term of this patent is extended or adjusted under 35 U.S.C. 154(b) by 0 days.

(21) Appl. No.: 17/262,225

(22) PCT Filed: Mar. 18, 2020

(86) PCT No.: PCT/CN2020/080012
§ 371 (c)(1),
(2) Date: Jan. 22, 2021

(87) PCT Pub. No.: WO2020/192529
PCT Pub. Date: Oct. 1, 2020

(65) Prior Publication Data
US 2021/0306757 A1    Sep. 30, 2021

(30) Foreign Application Priority Data
Mar. 25, 2019    (CN) .......................... 201910230852.2

(51) Int. Cl.
*H04R 9/02*    (2006.01)
*H04N 5/64*    (2006.01)

(52) U.S. Cl.
CPC ............. *H04R 9/025* (2013.01); *H04N 5/642* (2013.01); *H04R 2499/15* (2013.01)

(58) Field of Classification Search
CPC combination set(s) only.
See application file for complete search history.

(56) References Cited

U.S. PATENT DOCUMENTS

2019/0208300 A1*    7/2019    Lee ..................... H04R 17/00

FOREIGN PATENT DOCUMENTS

| CN | 108282724 A | 7/2018 |
|----|-------------|--------|
| CN | 108810759 A | 11/2018 |
| CN | 108966093 A | 12/2018 |
| CN | 109218943 A | 1/2019 |

(Continued)

OTHER PUBLICATIONS

First Office Action in counterpart Chinese Application No. 201910230852.2, dated Oct. 19, 2020.

(Continued)

*Primary Examiner* — Angelica M McKinney
(74) *Attorney, Agent, or Firm* — Menachem Nathan; Nathan & Associates

(57) ABSTRACT

Disclosed in the present application is a display device, comprising a display body and an electromagnetic vibration apparatus; the display body comprises a housing, a display screen mounted at a front end of the housing, and an optical module mounted within the housing, the housing comprising a back plate; the electromagnetic vibration apparatus is mounted on the back plate and emits sound by means of vibrating the back plate, the optical module, and the display screen.

11 Claims, 8 Drawing Sheets

(56) References Cited

FOREIGN PATENT DOCUMENTS

| | | |
|---|---|---|
| CN | 109729480 A | 5/2019 |
| CN | 109951753 A | 6/2019 |
| JP | 2007300578 A | 11/2007 |

OTHER PUBLICATIONS

International Search Report in corresponding PCT Application No. PCT/CN2020/080012, dated Jun. 5, 2020.
Written Opinion of the International Searching Authority in corresponding PCT Application No. PCT/CN2020/080012, dated Jun. 5, 2020.

* cited by examiner

DISPLAY DEVICE

CROSS REFERENCE TO RELATED APPLICATIONS

The present disclosure is the National Stage of International Application No. PCT/CN2020/080012, filed Mar. 18, 2020, which claims priority to Chinese Patent Application No. 201910230852.2, entitled "DISPLAY DEVICE" and filed on Mar. 25, 2019.

TECHNICAL FIELD

The disclosure relates to the technical field of electroacoustic conversion of electronic equipments, in particular to the technical field of electroacoustic conversion of an electronic equipment with a display screen, and in particular to a display device.

BACKGROUND

With the development of science and technology and for the convenience and beauty of television set, the thickness of the whole machine of the television set in exemplary art is thinner and thinner. In some extents, the expansion of the area of the paper basin of the loudspeaker box and the volume of the box body are limited, resulting that the bass effect is not ideal and the mounting of the high-pitch unit of the sound box is restricted in some sense and the high-pitch unit cannot sound forward, so that the high-pitch effect is not ideal.

On the other hand, the sound box in the exemplary technology is installed on the television and emits sound in a point source mode, the optimal sound listening position of the sound production mode is on the central axis of the two sound boxes, the number of users and the arrangement requirement of the listening position are high, and the use experience is reduced.

SUMMARY

The main purpose of the present disclosure is to provide a display device, aiming to solve the problem that the sound production effect of a traditional electronic device is not ideal and the user experience is reduced.

In order to achieve the above purpose, the present disclosure provides a display device, including:

a display body comprising a shell, a display screen installed on a front part of the display body, and an optical film group installed inside the shell, the shell comprising a back plate; and an electromagnetic vibration device installed on the back plate, and configured to generate sound through vibrating the back plate, the optical film group and the display screen.

Optionally, the electromagnetic vibration device includes:

a fixing assembly installed on the back plate fixedly; and a vibration assembly elastically connected to the fixing assembly or the back plate;

where, one of the vibration assembly and the fixing assembly is an electromagnetic assembly, the other one is a magnetic assembly, the magnetic assembly has an annular gap, the magnetic assembly includes a conductive coil, and the conductive coil is at least partially extended into the annular gap, and configured as being connected with electric signals and generating a relative vibration between the electromagnetic assembly and the magnetic assembly.

Optionally, the magnetic assembly includes a magnetizer and a magnetic body, the magnetizer is defined with an annular groove to form the annular gap, and the magnetic body is embedded in the magnetizer and annularly set on outside of the annular gap.

Optionally, a cross section of a wire of the conductive coil is in a rectangular shape. Optionally, a number of layers of the conductive coil in a radial direction is N, where a value of N is at least 1 and not more than 4.

Optionally, the fixing assembly is the electromagnetic assembly, and the vibration assembly is the magnet assembly.

The electromagnetic vibration device further includes an annular inner bracket, the annular inner bracket is configured between the back plate and the magnet assembly and sleeves a periphery of the conductive coil, a front end of the annular inner bracket is elastically installed on the electromagnetic assembly through an inner elastic member, and a rear end of the annular inner bracket is fixedly installed on the magnet assembly.

Optionally, the electromagnetic vibration device further includes an annular outer bracket, the annular outer bracket sleeves a periphery of the annular inner bracket, a front end of the annular outer bracket is fixedly connected to the back plate, and a rear end of the annular outer bracket is elastically installed on the magnet assembly through an outer elastic member.

Optionally, the inner elastic member is arranged in the annular inner bracket and is annularly configured on the periphery of the conductive coil, and a stiffness coefficient of the inner elastic member above the conductive coil is set to be larger than a stiffness coefficient of the inner elastic member below the conductive coil.

Optionally, the outer elastic member is arranged in the annular outer bracket and is annularly arranged on the periphery of the annular inner bracket, and a stiffness coefficient of the outer elastic member located above the annular inner bracket is set to be larger than a stiffness coefficient of the outer elastic member below the annular inner bracket.

Optionally, the annular inner bracket is defined with a plurality of heat dissipation fine holes, and/or the annular outer bracket is defined with a plurality of heat dissipation fine holes.

Optionally, the display device further includes a signal generating device, and the signal generating device is electrically connected with the electromagnetic vibration device and is configured to provide the electric signals for the conductive coil.

Optionally, the display device further includes a plurality of electromagnetic vibration devices which are connected in series and/or connected in parallel, and are electrically connected with the signal generating device.

Optionally, the display device further includes a power amplifier, and an input terminal of the power amplifier is connected with the signal generating device;

the electromagnetic vibration devices comprise a low-frequency electromagnetic vibration device and a high-frequency electromagnetic vibration device; and the high-frequency electromagnetic vibration device and the low-frequency electromagnetic vibration device are connected in parallel and then are connected to a same output terminal of the power amplifier.

Optionally, the display device further includes a power amplifier, and an input terminal of the power amplifier is connected with the signal generating device;

the electromagnetic vibration device includes a low-frequency electromagnetic vibration device and a high-frequency electromagnetic vibration device; and, the high-frequency electromagnetic vibration device and the low-frequency electromagnetic vibration device are respectively connected with two output terminals of the power amplifier.

In the technical scheme provided by the disclosure, the electromagnetic vibration device is configured at the back plate of the display body, the back plate, the shell, the optical film group and the display screen can be sequentially driven to vibrate when the electromagnetic vibration device vibrates. So that the vibration and the sound emitting of the display screen is achieved. Compared with the technical scheme of sound transmission through the sound box in the exemplary related technology, the area and the volume of the sound box paper basin of the technical scheme of the present disclosure are increased, the bass effect can be effectively improved, meanwhile, enough space is reserved for high-pitch sound production to improve the treble effect, so that excellent sound quality is formed, the range of the best listening area is expanded, and the user experience is facilitated.

BRIEF DESCRIPTION OF THE DRAWINGS

In order to more clearly illustrate the technical solutions of the embodiments or the exemplary technical techniques of this disclosure, brief introduce is made related to the accompanying drawings, which are used in the description of the embodiments or exemplary technical techniques. Obviously, the drawings in the following description are merely some embodiments of the present disclosure, for those skilled in the art, other figures can be obtained according to the structures illustrated in the figures without inventive effort.

Figure 1:
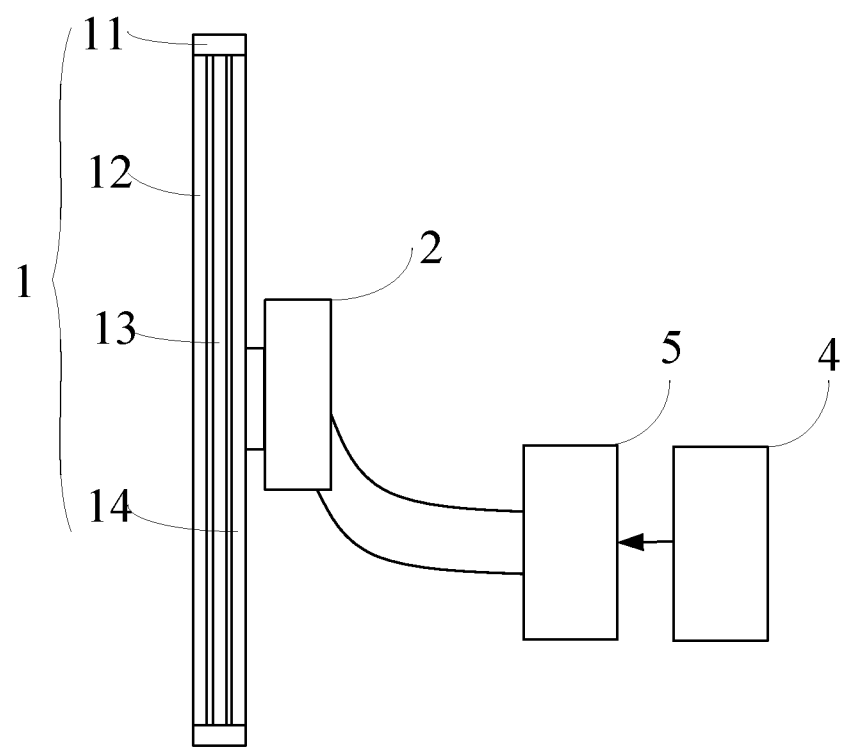
FIG. 1 is a partial structural diagram of an embodiment of a display device provided in the present disclosure.
Figure 2:
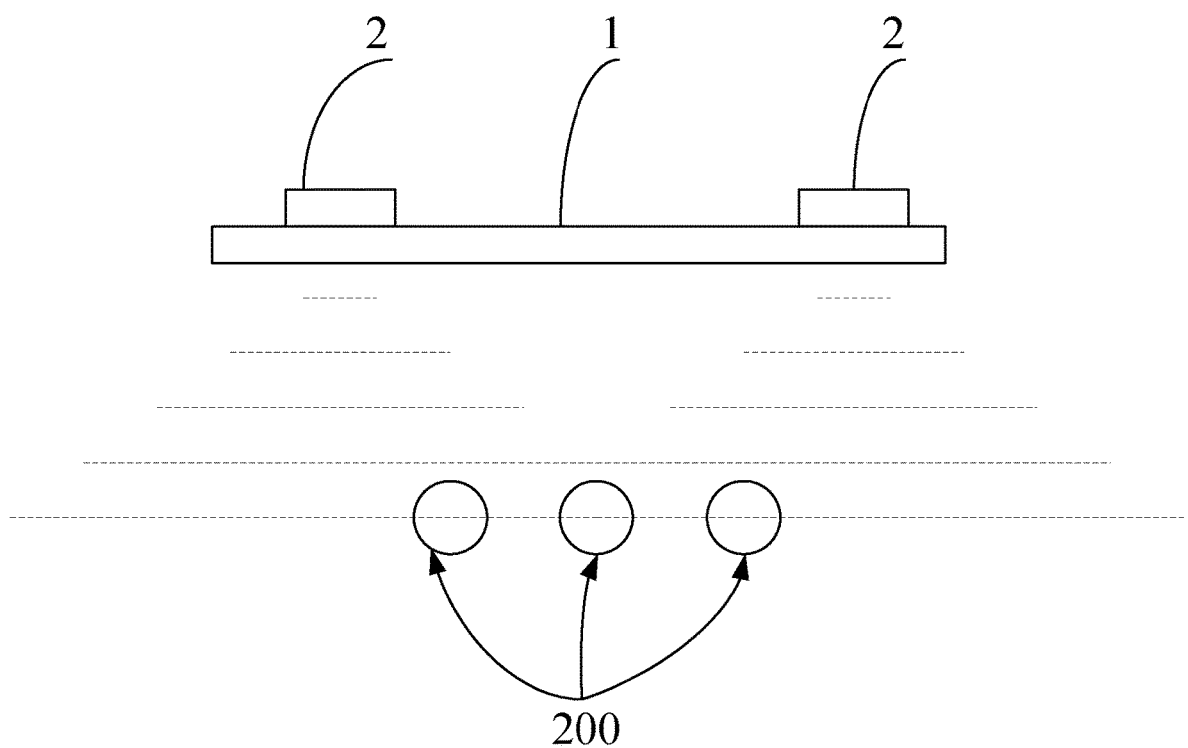
FIG. 2 is a schematic diagram of a sound source distribution of the display device of FIG. 1.

The description of the marks of the present disclosure:

| Mark | Name |
| --- | --- |
| 100 | Display device |
| 1 | Display body |
| 11 | Shell |
| 12 | Display screen |
| 13 | Optical film group |
| 14 | Back plate |

-continued

| Mark | Name |
| --- | --- |
| 2 | Electromagnetic vibration device |
| 2a | High-frequency electromagnetic vibration device |
| 2b | Low-frequency electromagnetic vibration device |
| 21 | Electromagnetic assembly |
| 211 | Conductive coil |
| 212 | Support |
| 22 | Magnet assembly |
| 221 | Annular gap |
| 222 | Magnetize |
| 222a | Annular groove |
| 223 | Magnet |
| 23 | Annular inner bracket |
| 24 | Annular outer bracket |
| 31 | Inner elastic member |
| 32 | Outer elastic member |
| 4 | Signal generating device |
| 5 | Power amplifier |
| 200 | User |

DETAILED DESCRIPTION OF THE EMBODIMENTS

The technical solutions in the embodiments of the present disclosure will be clearly and completely described in conjunction with the drawings in the embodiments of the present disclosure, and obviously, the described embodiments are merely a part of the embodiments of the present disclosure and not all embodiments. Based on the embodiments in the present disclosure, all other embodiments obtained by one of ordinary skill in the art without creative work are within the scope of the present disclosure.

It should be noted that, in the embodiments of the present disclosure, directional indications such as upper, lower, left, right, front, rear, and the like are involved. The directional indications are only used to interpret relative positional relationships, motion conditions, etc. between components in a particular pose (as shown in the figure), and if the particular pose changes, the directional indication also changes accordingly.

In addition, if a description of "first", "second" and the like in the embodiments of the present disclosure is described, the description of the "first", "second" and the like is for the purpose of description only and is not to be construed as indicating or implying the relative importance or implicitly indicating the number of technical features indicated. Thus, a feature defining with "first", "second" may explicitly or implicitly include at least one of the features. In addition, the meaning of "and/or" appearing in the whole includes three parallel schemes, including an A scheme, or a B scheme, or both A and B scheme that are simultaneously satisfied. In addition, the technical solutions between the various embodiments can be combined with each other, but must be implemented based on one of ordinary skill in the art, and when the combination of the technical solutions is contradictory or cannot be realized, the combination of the technical solutions should not be considered to exist and are not within the protection scope claimed by the present disclosure.

With the development of science and technology and for the convenience and beauty of television set, the thickness of the whole machine of the television set in exemplary art is thinner and thinner. In some extents, the expansion of the area of the paper basin of the loudspeaker box and the volume of the box body are limited, resulting that the bass effect is not ideal and the mounting of the high-pitch unit of the sound box is restricted in some sense and the high-pitch unit cannot sound forward, so that the high-pitch effect is not ideal.

On the other hand, the sound box in the exemplary technology is installed on the television and emits sound in a point source mode, the optimal sound listening position of this sound production mode is on the central axis of the two sound boxes, the number of users and the arrangement requirement of the listening position are high, and the user experience for the user is weaken.

In view of this, the present disclosure provides a display device, and FIGS. 1-8 are specific embodiments of a display device provided in the present disclosure.

Referring to FIG. 1, in one embodiment, the display device 100 includes a display body 1 and an electromagnetic vibration device 2, where the display body 1 includes a shell 11, a display screen 12 installed at a front end of the shell 11, and an optical film group 13 installed in the shell 11. The shell 11 includes a back plate 14. The back plate 14 can be made of glass materials with various thicknesses and can also be made of a metal material. The electromagnetic vibration device 2 is installed on the back plate 14 and generates sound by vibrating the back plate 14, the optical film group 13 and the display screen 12. The display screen 12 in one embodiment is an LCD display screen. When a gap between the optical film group 13 and the display screen 12 and the back plate 14 is small, transmission of vibration power between the back plate 14, the optical film group 13 and the display screen 12 is improved, but the display screen 12 is easily scratched by this mean. Conversely, when the gap is large, the display screen 12 is easily shaken with the audio signal, especially the bass signal, causing instability of the picture quality. Therefore, in order to achieve a better display effect, the gap needs to be set in a suitable range, for example, preferably, the value of the gap is set to be at least 0.1 and not more than 0.7 mm.

In the technical scheme provided by the disclosure, the electromagnetic vibration device 2 is arranged at the back plate 14 of the display main body 1, the back plate 14, the housing 11, the optical film group 13 and the display screen 12 can be sequentially driven to vibrate when the electromagnetic vibration device 2 vibrates, therefore, the vibration sound of the display screen 12 is achieved. Compared with the technical scheme of sound transmission through the sound box in the exemplary technology, the mode that vibration of the back plate 14 finally driving the display screen 12 to vibrate is equivalent to increasing an area and a volume of the sound box paper basin, the bass effect can be effectively improved. Meanwhile, enough space is reserved for high-pitch sound production to improve the treble effect, so that excellent sound quality is formed. In addition, referring to FIG. 2, the point source formed by the overall vibration of the display screen 12 is a face sound source, and compared with a point source in the exemplary technology, the face sound source has a larger optimal sound listening area for a user 200 to select by will, thereby facilitating the usage of the user 200.

Figure 3:
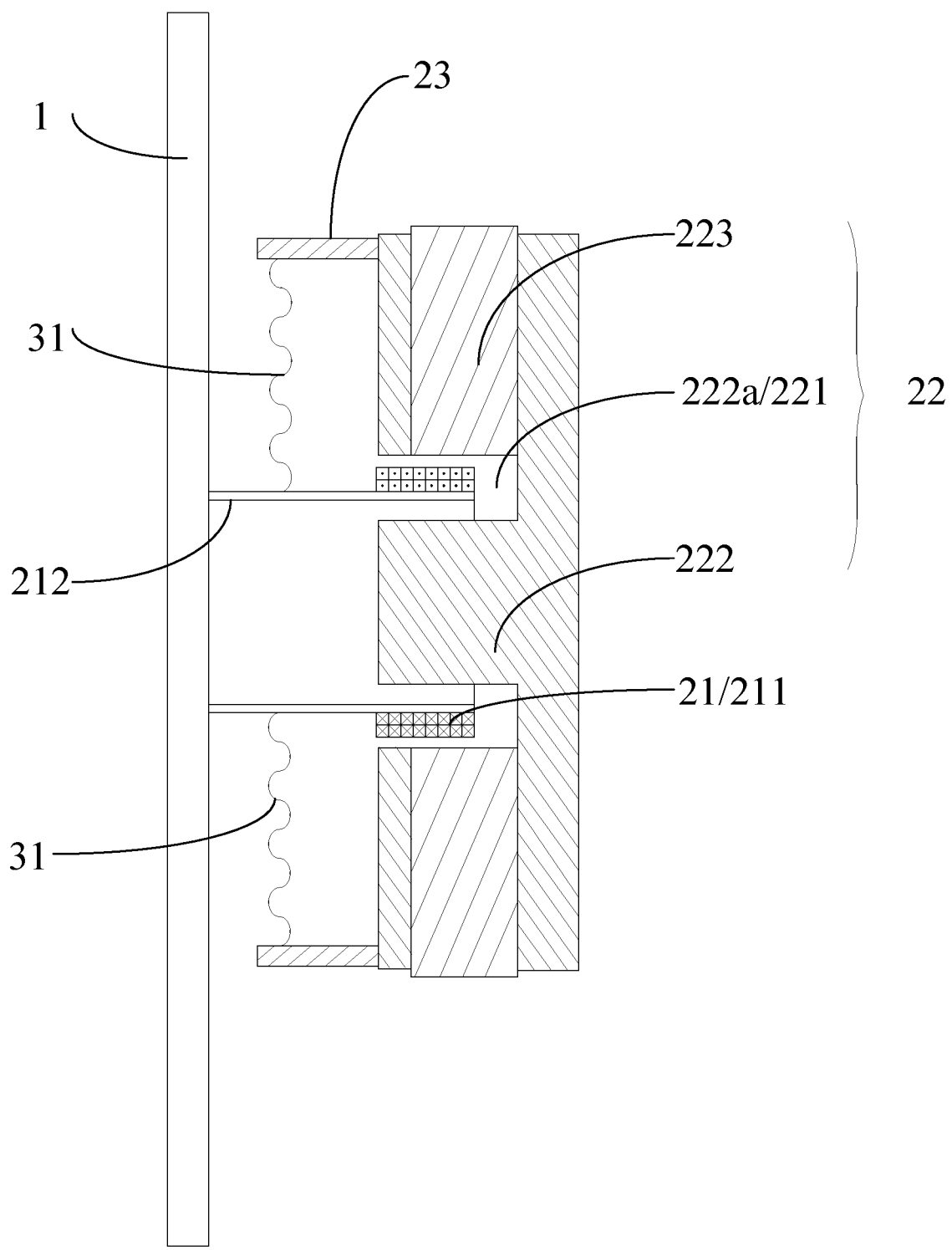
FIG. 3 is a schematic cross-sectional view of a first embodiment of an electromagnetic vibration device of FIG. 1.
Figure 4:
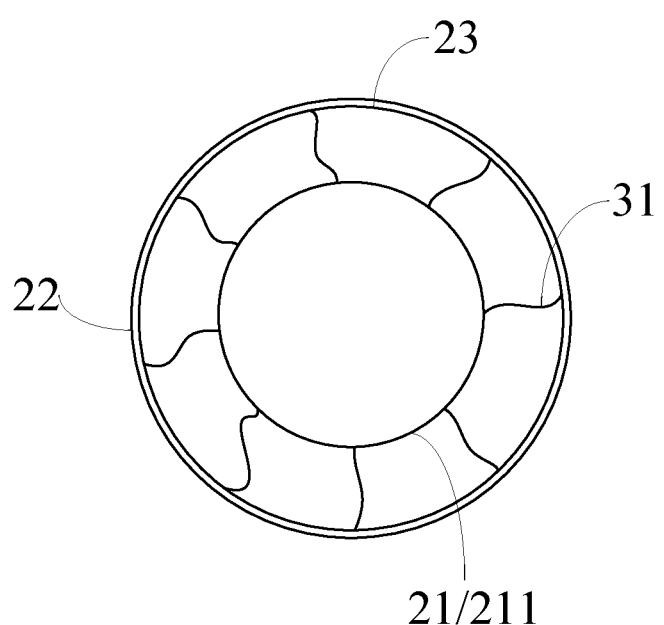
FIG. 4 is a rear structural diagram of the electromagnetic vibration device of FIG. 3.

Specifically, referring to FIG. 3, in one embodiment, the electromagnetic vibration device 2 includes a fixing assembly and a vibration assembly, where the fixing assembly is fixedly installed on the back plate 14. The vibration assembly is elastically connected to the fixing assembly or the back plate 14. One of the vibration assembly and the fixing assembly is an electromagnetic assembly 21, and the other is a magnet assembly 22. The magnet assembly 22 has an annular gap 221. The electromagnetic assembly 21 includes a conductive coil 211. The conductive coil 211 extends at least partially into the annular gap 221. When an electrical signal is passed, the electromagnetic assembly 21 and the magnet assembly 22 generate relative vibration. Taking the electromagnetic component 21 being the fixing component, and the magnet assembly 22 being the vibration assembly as an example, the magnet assembly 22 forms a relatively uniform magnetic field at the annular gap 221, the conductive coil 211 interacts with the magnetic field after being electrified so that mutual acting force is generated between the magnet assembly 22 and the electromagnetic assembly 21, thereby generating vibration. For the conductive coil 211 is fixedly connected with the back plate 14 to form a whole, the conductive coil 211 can drive the back plate 14 to vibrate under the driving of the reaction force, thereby finally realizing vibration of the display screen 12. It should be noted that the magnitude of the vibration force between the vibration assembly and the fixed assembly is related to the electrical signal, such as when the electrical signal is a current signal, the vibration power F increases with the increase of the current value I according to the formula F=BLI (where BL is set as a constant), and the vibration power F can be adjusted by adjusting the magnitude of the current value I depending on the specific application requirement.

Moreover, the technical schemes of the specific structures of the magnet assembly 22 are various and not limited in the embodiments. For example in one embodiment, the magnet assembly 22 includes a magnetizer 222 and a magnet 223. The magnetizer 222 is defined with an annular groove 222a to form the annular gap 221. The magnet 223 is embedded in the magnetizer 222 and is annularly configured on a periphery of the annular groove 222a, so that the magnet 223 and the magnetizer 222 sufficiently sense to form a uniform magnetic field. In addition, since the conductive coil 211 is generally in a cylindrical shape, the annular groove 222a is more adaptive for the cylindrical shape, so that a larger magnetic field area is formed in the limited magnetic conductive body 222 for the conductive coil 211 to act, so that uniform and stable relative vibration is generated, and the sound formed by the vibration has a good sound effect.

In view of the above formula F=BLI, L refers to a length of the conductive coil 211. Therefore, In order to improve an electroacoustic conversion efficiency, the numerical value of the L can also be selected to be moderately increased, for example, in one embodiment, a wire cross section of the conductive coil 211 is configured in a rectangular shape, as compared to a circular arrangement in the exemplary technology, the rectangular shape enables the arrangements of conductive lines can be more compact and almost no gap therebetween, so that the space utilization rate can be effectively improved, and the conductive coil 211 is longer in length and larger in diameter in a limited space. And/or, a number of layers of the conductive coil 211 in a radial direction is N, where a value of N is at least 1 and not larger than 4, and the numerical value of L is increased by adopting a multi-layer winding mode. In addition, wire rods of the conductive coil 211 is preferably a copper material or an aluminum material, and an outer surface of the copper material or the aluminum material is subjected to a paint coating treatment so as to ensure the insulation between every two adjacent wire rods.

It should be noted that, in a specific case of the fixing component being the electromagnetic component 21, and the vibration assembly being the magnet assembly 22, a fixed connection between the conductive coil 211 and the back plate 14 can be achieved, for example, by a support 212. Specifically, the support 212 is disposed between the conductive coil 211 and the back plate 14, so that the conductive coil 211 is wound around a back end of the support 212. A front end of the support 212 is fixedly attached to the back plate 14. The support 212 helps to adjust the distance between the electromagnetic assembly 21 and the magnet assembly 22 within a suitable range, and helps to reduce the number of turns of the conductive coil 211. In addition, the adhesive layer between the support member 212 and the back plate 14 is preferably set to have a hardness level same as that of the conventional plastic after air drying, so that the reduction of the electroacoustic conversion efficiency, especially the conversion efficiency of the sound in the high-frequency segment due to transmission attenuation of the vibration force of the electromagnetic vibration device 2 to the back plate 14 caused by the softer adhesive layer is avoided. The elastic installation modes between the magnet assembly 22 and the electromagnetic assembly 21 or the back plate 14 are also various. For example, referring to FIGS. 3 and 4, in the first embodiment provided by the present disclosure, the electromagnetic vibration device 2 further includes an annular inner bracket 23. The annular inner bracket 23 is configured between the back plate 14 and the magnet assembly 22 and sleeves a periphery of the conductive coil 211 and/or the support 212, A front end of the annular inner bracket 23 is elastically installed on the electromagnetic assembly 21 through an inner elastic member 31, a rear end of the annular inner bracket 23 is fixedly installed on the magnet assembly 22. The manner of annular inner bracket 23 cooperating with the inner elastic member 31 enables the magnet assembly 22 to be elastically connected to the electromagnetic assembly 21 in multiple directions, so that vibration in multiple directions can be uniformed and consistent without mutation.

Figure 5:
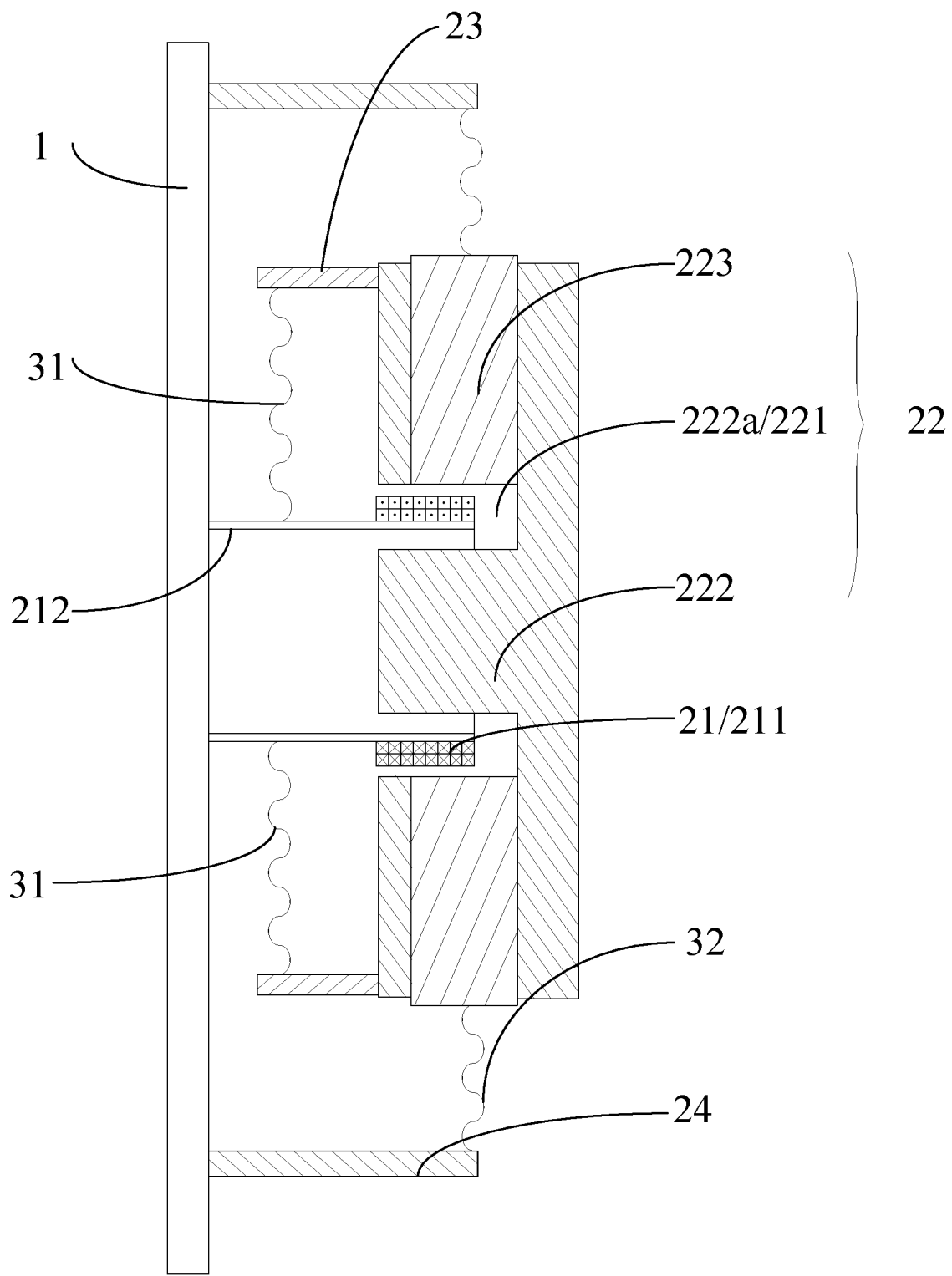
FIG. 5 is a schematic cross-sectional view of a second embodiment of the electromagnetic vibration device of FIG. 1.
Figure 6:
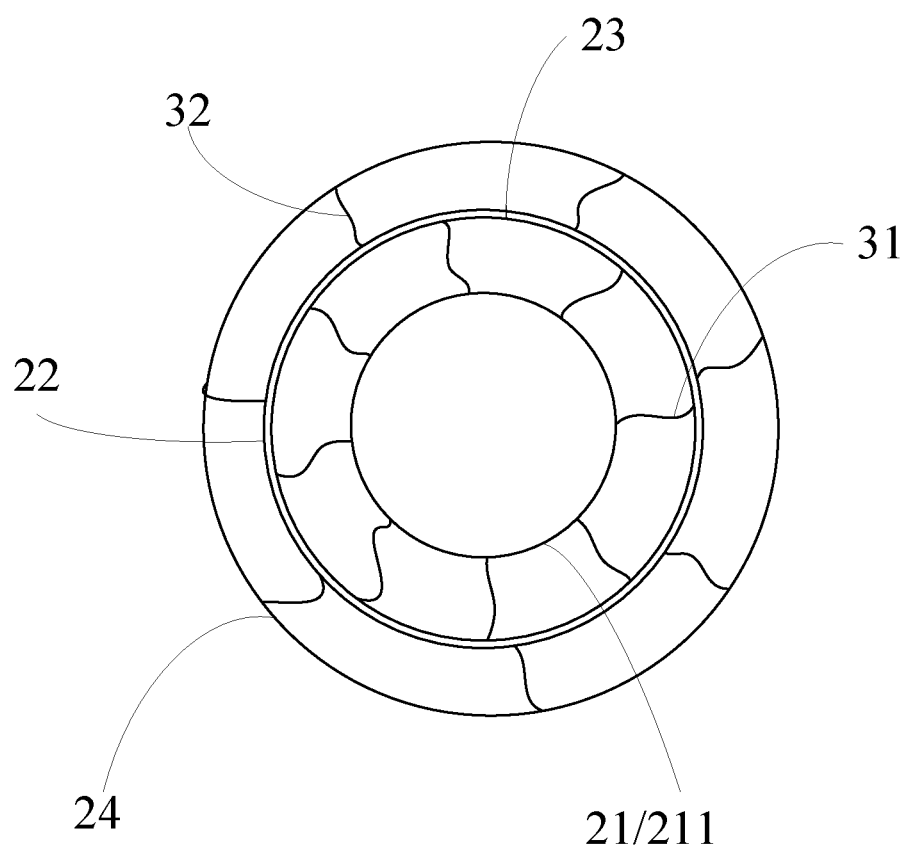
FIG. 6 is a rear structural diagram of the electromagnetic vibration device of FIG. 5.
Figure 7:
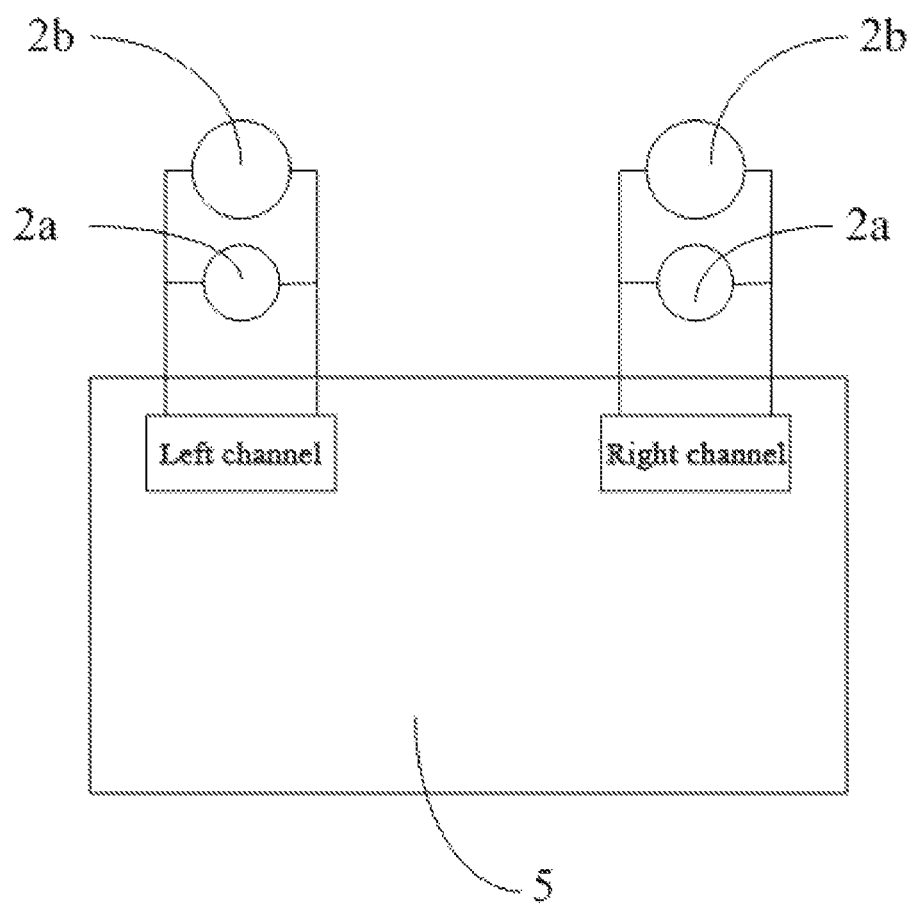
FIG. 7 is a schematic diagram of a first embodiment of a connection relationship between the electromagnetic vibration device and a power amplifier of FIG. 1.
Figure 8:
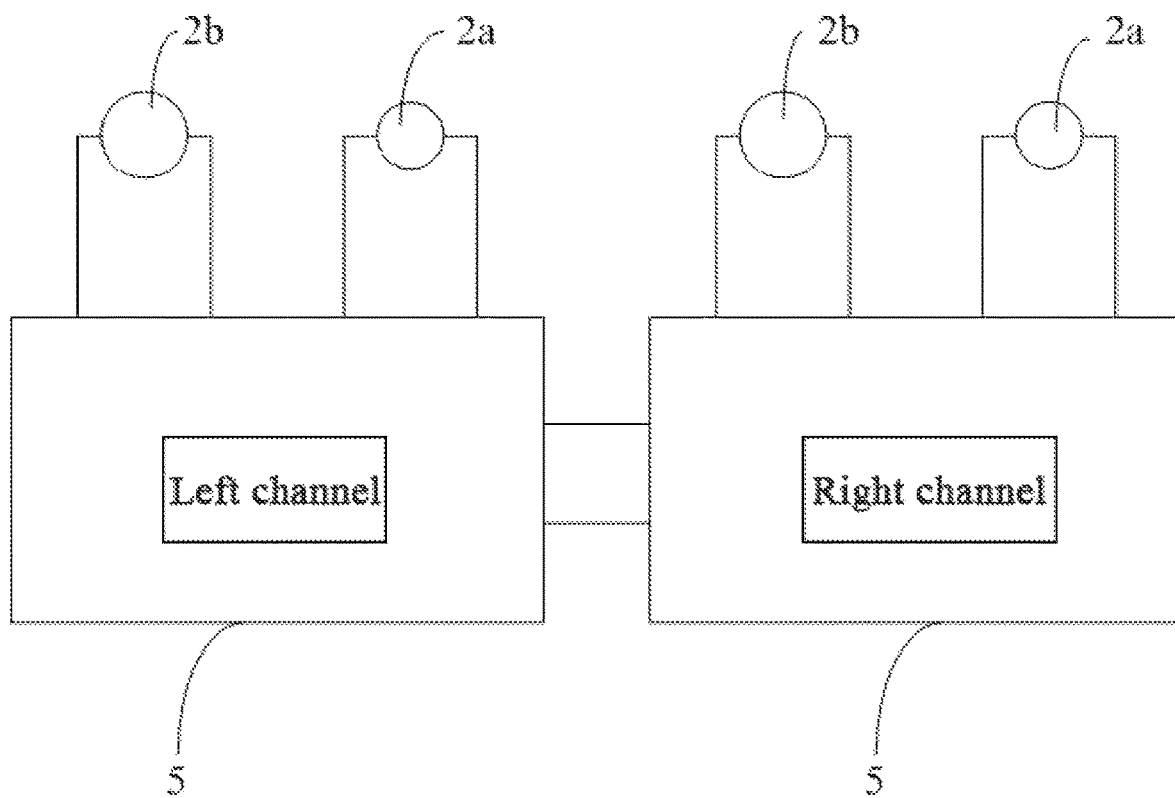
FIG. 8 is a schematic diagram of a second embodiment of the connection relationship between the electromagnetic vibration device and the power amplifier of FIG. 1.

Furthermore, in order to enhance the elastic installation effect of the magnet assembly 22, please refer to FIG. 5 and FIG. 6, in a second embodiment provided by the present disclosure, the electromagnetic vibration device 2 further includes an annular outer bracket 24. The annular outer bracket 24 is sleeved on a periphery of the annular inner bracket 23, a front end of the annular outer bracket 24 is fixedly connected to the back plate 14, and a rear end of the annular outer bracket 24 is elastically installed on the magnet assembly 22 through an outer elastic member 32. The staggered setting of the inner elastic member 31 and the outer elastic member 32 helps to ensure that the overall installation of the electromagnetic vibration device 2 is more stable. In addition, the inner elastic member 31 and the outer elastic member 32 can be specifically configured as springs, metal elastic sheets or corrugated paper sheets or the like, so that enough elastic deformation performance is ensured; moreover, the inner elastic member 31 and the outer elastic member 32 can be made of the same material and can also be configured differently.

Since the electromagnetic vibration device 2 itself has a certain weight, preferably, the inner elastic member 31 is configured in the annular inner bracket 23 and is annularly arranged at the periphery of the conductive coil 211, and a stiffness coefficient of the inner elastic member 31 located above the conductive coil 211 (hereinafter referred to as the upper half section) is set to be greater than a stiffness coefficient of the inner elastic member 31 located under the conductive coil 211 (hereinafter referred to simply as the lower half section); and/or the outer elastic member 32 is disposed in the annular outer bracket 24 and is annularly configured at the periphery of the annular inner bracket 23. A stiffness coefficient of the outer elastic member 32 above the annular inner bracket 23 is set to be greater than a stiffness coefficient of the outer elastic member 32 below the annular inner bracket 23. Taking the inner elastic member 31 as an example, when the electromagnetic vibration device 2 is in a static state, the stiffness coefficient of the upper half section is set to be K11. the upper half section is in a tiny compressed state and a compression distance is S1; the stiffness coefficient of the lower half section is set to be K12, and the lower half section is in a stretched state and a stretching distance is S2. Since S1 is less than S2, when the K11 is set to be greater than the K12, the stress of the upper half section and the stress of the lower half section can be ensured to be mutually balanced, so that gravity centers of the electromagnetic assembly 21 and the magnet assembly 22 are located on a same horizontal line, so that a balance is achieved, the deflection of the conductive coil 211 and the support 212 due to the falling of the magnet assembly 22 after long-term usage is avoided, and the short circuit caused by mutual friction between the conductive coil 211 and the magnetizer 222 due to the deflection of the conductive coil 211 and the support 212 is also avoid. In addition, the annular inner bracket 23 and/or the annular outer bracket 24 are defined with a plurality of heat dissipation fine holes for dissipating heat of the electromagnetic vibration device 2 in a working state, so that the sound quality effect is better guaranteed, and the service life of the electromagnetic vibration device 2 is prolonged.

In order to achieve independent work of the display device 100, the display device 100 further includes a signal generating device 4, which is electrically connected with the electromagnetic vibration device 2 and is configured for providing electric signals to the conductive coil 211. The specific selection of the signal generating device 4 may refer to the exemplary related art, and is not described in detail here.

In view of the above, in one embodiment, the electromagnetic vibration device 2 is configured to be multiple, the plurality of electromagnetic vibration devices 2 are connected in series and/or connected in parallel, and is electrically connected to the signal generating device 4. The display device 100 can adjust the weight, the size and other parameters of the electromagnetic vibration device 2 and the number of the electromagnetic vibration devices 2 to achieve the optimal vibration effect. When the plurality of electromagnetic vibration devices 2 are used in combination, impedance values of the electromagnetic vibration devices 2 can be adjusted, and the corresponding adjustment power is facilitated for the electric signal with the same voltage amplitude. For example, the electromagnetic vibration devices 2 are configured to be four, and the impedance of each electromagnetic vibration device 2 is 8 ohm, and the maximum output voltage is 8 V. At this time, the four electromagnetic vibration devices 2 can be connected in parallel to obtain larger power, or be connected in series to obtain smaller power; or by means of series connection and parallel connection between the four electromagnetic vibration devices 2, a moderate power can be obtained, which of the manners is selected is in accordance with actual conditions and is not described in details here.

In addition, in one embodiment, the display device 100 further includes a power amplifier 5, and an input terminal of the power amplifier 5 is connected with the signal generating device 4. The electromagnetic vibration device 2 includes a low-frequency electromagnetic vibration device 2b and a high-frequency electromagnetic vibration device 2a. The low-frequency electromagnetic vibration device 2b is generally relatively large in size and relatively heavy in mass, and the vibration resonance frequency generated by the low-frequency electromagnetic vibration device 2b is relatively low. The low-frequency electromagnetic vibration device 2b has excellent low-frequency electroacoustic conversion efficiency, but the high-frequency electroacoustic conversion efficiency is poor. In a similar way, the high-frequency electromagnetic vibration device 2a is relatively small in size and light in mass, and generates higher resonance frequency. The high-frequency electromagnetic vibration device 2a has an excellent high-frequency electroacoustic conversion efficiency. However, the low-frequency electroacoustic conversion efficiency is poor. Therefore, the low-frequency electromagnetic vibration device 2b and the high-frequency electromagnetic vibration device 2a are preferably used in combination. In particular, referring to FIG. 7, In the case of capacitive frequency division, the high-frequency electromagnetic vibration device 2a and the low-frequency electromagnetic vibration device 2b are connected in parallel and then are connected to a same output terminal of the power amplifier 5, the high-frequency electromagnetic vibration device 2a and the low-frequency electromagnetic vibration device 2b can be connected in series with a capacitor to form a high-pass filter, so that an electric signal above a cut-off frequency is distributed to the high-frequency electromagnetic vibration device 2a, an electric signal below the cut-off frequency is prevented from burning the high-frequency electromagnetic vibration device 2a, and only one power amplifier 5 is needed to realize sound transmission of a left channel and a right channel. Alternatively, referring to FIG. 8, the high-frequency electromagnetic vibration device 2a and the low-frequency electromagnetic vibration device 2b are respectively connected with two output ends of the power amplifier 5, and the sound transmission of the left channel and the right channel is realized by configuring the two power amplifiers 5 respectively.

In addition, a arrangement mode of the electromagnetic vibration device 2 on the back plate 14 is related to a installation mode of the display device 100, to achieve a better sound quality effect, for example, when the display device 100 is installed in a wall hanging mode, a plurality of electromagnetic vibration devices 2 are preferably configured on two sides of left and right installing points, so that the display device 100 is in a stress balance state during operation. When the display device 100 is installed in a seat-installed mode, the plurality of electromagnetic vibration devices 2 are preferably configured at positions over and close to the seat, and the stable installation of the display device 100 is also facilitated. It should be noted that different installation modes enable the back plate 14 to be provided with different fixed positions, so that the plurality of electromagnetic vibration devices 2 are different from the fixed position, so that the stiffness coefficient of the fixing assembly itself is affected, the resonance frequency of the fixing assembly is further influenced, and the whole sound audio frequency response curve of the display device 100 is further influenced. In this regard, for a part of the display device 100 with a digital power amplifier and a core, a digital filter can be configured at the digital power amplifier or the core to compensate the sound audio frequency response curve, and specifically, reference is made to the exemplary related technology, and is not described in detail here. In addition, the display device 100 further includes a filtering component or a limiting component, where the filtering component or the limiting component is configured between the signal generating device 4 and the electromagnetic vibration device 2 and is configured for filtering out a preset electric signal, so that the vibration of the display screen 12 is in a preset frequency band or a preset amplitude. The filtering component is, for example, a high-pass filter, so that the vibration of the electromagnetic vibration device 2 is at a frequency band above the resonant frequency, and distortion or other noise caused by generating a large vibration amplitude is avoided.

The above description is merely a preferred embodiment of the present disclosure, and is not intended to limit the scope of the present disclosure. Any equivalent structural transformation made by using the description and the drawings of the present disclosure or direct/indirect disclosure in other related technical fields under the inventive concept of the present disclosure is included in the patent protection scope of the present disclosure.

The invention claimed is:

1. A display device, comprising:
a display body comprising a shell, a display screen installed on a front part of the display body, and an optical film group installed inside the shell, wherein the shell comprises a back plate; and
an electromagnetic vibration device installed on the back plate, configured to vibrate the back plate, the optical film group, and the display screen to generate sound, and comprising:
a fixing assembly fixedly installed on the back plate and configured as an electromagnetic assembly, wherein the electromagnetic assembly comprises a conductive coil;
a vibration assembly elastically connected to the fixing assembly or the back plate and configured as a magnetic assembly, wherein the magnetic assembly has an annular gap, and the conductive coil extends at least partially into the annular gap and is configured to cause relative vibration between the fixing assembly and the vibration assembly when an electric signal is applied to the conductive coil;
an annular inner bracket disposed between the back plate and the vibration assembly and sleeved on a periphery of the conductive coil, wherein a front end of the annular inner bracket is elastically installed on the fixing assembly through an inner elastic member, and a rear end of the annular inner bracket is fixedly installed on the vibration assembly; and
an annular outer bracket sleeved on a periphery of the annular inner bracket, wherein a front end of the annular outer bracket is fixedly connected to the back plate, and a rear end of the annular outer bracket is elastically installed on the vibration assembly through an outer elastic member.

2. The display device of claim 1, wherein the magnetic assembly comprises a magetizer and a magnetic body, the magnetizer is defined with an annular groove to form the annular gap, the magnetic body is embedded in the magnetizer and annularly set on outside of the annular gap.

3. The display device of claim 1, wherein a cross section of a wire of the conductive coil is in a rectangular shape.

4. The display device of claim 1, wherein a number of layers of the conductive coil in a radial direction is N, wherein a value of N is at least 1 and not more than 4.

5. The display device of claim 1, wherein the inner elastic member is arranged in the annular inner bracket and is annularly configured on the periphery of the conductive coil, wherein a stiffness coefficient of the inner elastic member above the conductive coil is set to be larger than a stiffness coefficient of the inner elastic member below the conductive coil.

6. The display device of claim 1, wherein the outer elastic member is arranged in the annular outer bracket and is annularly arranged on the periphery of the annular inner bracket, wherein a stiffness coefficient of the outer elastic member located above the annular inner bracket is set to be larger than a stiffness coefficient of the outer elastic member below the annular inner bracket.

7. The display device of claim 1, wherein the annular inner bracket is defined with a plurality of heat dissipation fine holes, and/or, the annular outer bracket is defined with a plurality of heat dissipation fine holes.

8. The display device of claim 1, further comprising a signal generating device, wherein the signal generating device is electrically connected with the electromagnetic vibration device and is configured to provide the electric signals for the conductive coil.

9. The display device of claim 8, wherein the display device comprises a plurality of electromagnetic vibration devices which are connected in series and/or connected in parallel, and are electrically connected with the signal generating device.

10. The display device of claim 9, wherein the display device further comprises a power amplifier, and an input terminal of the power amplifier is connected with the signal generating device;
   the electromagnetic vibration devices comprise a low-frequency electromagnetic vibration device and a high-frequency electromagnetic vibration device; and
   the high-frequency electromagnetic vibration device and the low-frequency electromagnetic vibration device are connected in parallel and then are connected to a same output terminal of the power amplifier.

11. The display device of claim 9, wherein the display device further comprises a power amplifier, and an input terminal of the power amplifier is connected with the signal generating device;
   the electromagnetic vibration device comprises a low-frequency electromagnetic vibration device and a high-frequency electromagnetic vibration device; and
   the high-frequency electromagnetic vibration device and the low-frequency electromagnetic vibration device are respectively connected with two output terminals of the power amplifier.

* * * * *